(12) United States Patent
Liu et al.

(10) Patent No.: US 12,482,122 B2
(45) Date of Patent: Nov. 25, 2025

(54) SELF-SUPERVISED IMAGE DEPTH ESTIMATION METHOD BASED ON CHANNEL SELF-ATTENTION MECHANISM

(71) Applicants: Jining University, Jining (CN); Shanghai University, Shanghai (CN)

(72) Inventors: Jun Liu, Jining (CN); Hengyu Li, Shanghai (CN); Lei Wan, Shanghai (CN); Jingyi Liu, Shanghai (CN); Yueying Wang, Shanghai (CN); Shaorong Xie, Shanghai (CN); Jun Luo, Shanghai (CN)

(73) Assignees: Jining University, Jining (CN); Shanghai University, Shanghai (CN)

( * ) Notice: Subject to any disclaimer, the term of this patent is extended or adjusted under 35 U.S.C. 154(b) by 176 days.

(21) Appl. No.: 18/397,990

(22) Filed: Dec. 27, 2023

(65) Prior Publication Data
US 2025/0078299 A1    Mar. 6, 2025

(30) Foreign Application Priority Data
Sep. 1, 2023  (CN) .......................... 202311124246.5

(51) Int. Cl.
  *G06T 7/593*   (2017.01)
  *G06T 3/40*    (2024.01)
  (Continued)

(52) U.S. Cl.
  CPC .............. *G06T 7/593* (2017.01); *G06T 3/40* (2013.01); *G06T 7/80* (2017.01); *H04N 13/239* (2018.05);
  (Continued)

(58) Field of Classification Search
  CPC .. G06T 7/593; G06T 3/40; G06T 7/80; G06T 2207/20081; G06T 2207/20084; G06T 2207/30244; G06T 7/246; G06T 7/579; G06T 7/55; G06T 7/73; G06T 2207/10004; H04N 13/239; H04N 13/271;
  (Continued)

(56) References Cited

U.S. PATENT DOCUMENTS

2020/0273190 A1* 8/2020 Ye ........................... G06T 7/579
2020/0351489 A1* 11/2020 Watson .................. G06N 20/00
(Continued)

*Primary Examiner* — Farzana Hossain
(74) *Attorney, Agent, or Firm* — Nixon Peabody LLP

(57) ABSTRACT

Disclosed is a method for constructing a bionic binocular active visual simultaneous localization and mapping (SLAM) system. The method includes: S1, constructing a binocular active visual system, peripheral vision is simulated using a panoramic camera, a panoramic value map is constructed based on the panoramic camera, and a binocular bionic eye gaze control strategy based on the panoramic value map is proposed; S2, designing a SLAM algorithm framework which is suitable for motion of the two bionic eyes, where relative pose optimization of left and right cameras based on a Perspective-n-Point algorithm and depth calculation for binocular matching points based on triangulation are adopted in a SLAM tracking thread; and S3, with the assistance of camera poses estimated by the SLAM system and sparse landmark point coordinates, training a self-supervised depth estimation network, to provide dense depth estimation for a mapping module of the SLAM system, achieving dense mapping.

18 Claims, 8 Drawing Sheets

(51) Int. Cl.
*G06T 7/80* (2017.01)
*H04N 13/00* (2018.01)
*H04N 13/239* (2018.01)
*H04N 13/271* (2018.01)
*H04N 23/61* (2023.01)
*H04N 23/698* (2023.01)

(52) U.S. Cl.
CPC ........... *H04N 13/271* (2018.05); *H04N 23/61* (2023.01); *H04N 23/698* (2023.01); *G06T 2207/20081* (2013.01); *G06T 2207/20084* (2013.01); *G06T 2207/30244* (2013.01); *H04N 2013/0081* (2013.01)

(58) Field of Classification Search
CPC ................. H04N 23/61; H04N 23/698; H04N 2013/0081; G06N 3/045; G06N 3/08; G06N 20/00; G06N 3/0455; G06N 3/0464; G06N 3/048; G06N 3/0895; Y02T 10/40
See application file for complete search history.

(56) References Cited

U.S. PATENT DOCUMENTS

| | | | |
|---|---|---|---|
| 2023/0023126 A1* | 1/2023 | Ansari | G06T 7/55 |
| 2023/0240818 A1* | 8/2023 | Querbes | G06T 7/337 |
| | | | 433/29 |

* cited by examiner

US 12,482,122 B2

SELF-SUPERVISED IMAGE DEPTH ESTIMATION METHOD BASED ON CHANNEL SELF-ATTENTION MECHANISM

CROSS REFERENCE TO RELATED APPLICATION

This patent application claims the benefit of and priority to Chinese Patent Application No. 2023111242465, which was filed with the Chinese Patent Office on Sep. 1, 2023, which is hereby incorporated by reference herein in its entirety.

TECHNICAL FIELD

The present disclosure relates to the technical field of computer vision, and in particular, to a method for constructing a bionic binocular active visual simultaneous localization and mapping (SLAM) system using an improved SLAM algorithm and a dense mapping module consisting of a self-supervised depth estimation network based on a channel self-attention mechanism.

BACKGROUND

Simultaneous localization and mapping (SLAM) involves real-time calculations of relative pose (position and orientation) transformation of a robot using input data from sensors to achieve robot localization, and incremental construction of a map of an observed scene during movement of the robot. With the development and advancement of science and technology, human demand for robots has grown, with the goal of making robots intelligent and automated to perform complex tasks. Since the inception of SLAM, it has received significant attention from researchers as a crucial solution to autonomous navigation for robots.

Depending on the type of sensors used, SLAM can be categorized into visual SLAM and laser SLAM. Visual SLAM has advantages such as low cost and rich image information, making it suitable for environments with geometric similarity and addressing issues such as loop-closure detection. However, most of the visual systems mounted on robots today simply fix visual sensors directly to the robot, resulting in a substantial gap in visual perception capabilities compared to human eyes. For instance, human eyes can achieve rapid and precise gaze positioning and smooth tracking of moving targets, and maintain stable gaze during head movement through a vestibulo-ocular reflex mechanism.

When a robot equipped with a visual sensor runs SLAM in an unknown environment, the system passively receives image data captured by the visual sensor during motion of the robot, and perceives the pose and ambient environment of the robot according to these data. The SLAM system faces tracking failures when the images captured by the visual sensor have sparse textures or numerous dynamic objects. Therefore, inspired by the peripheral and central visual perception mechanisms of human eyes, a bionic eye system with peripheral and central vision can be constructed, such that the system has active visual capabilities. During SLAM tasks, the bionic eye can actively extract key information from visual information of the entire scene and control the motion to shift the gaze to areas with key (high-value) information.

In recent years, the rapid development of deep learning has significantly accelerated the innovation of depth estimation algorithms. To avoid the high cost of obtaining true depth data, self-supervised depth estimation algorithms have become a research direction. Some researchers have already proposed a self-supervised monocular depth estimation method, using estimated depth and camera motion to reconstruct a current frame from previous and subsequent frames, forming supervision between multiple views. Based on the concept of this method, the present disclosure utilizes a depth estimation network based on a channel self-attention mechanism and a camera pose estimated by the SLAM system to reconstruct a target frame and trains the network by minimizing the reconstruction error.

SUMMARY

An objective of the present disclosure is to enhance a localization and mapping capability of a robot in unknown environments. Inspired by peripheral and central visual characteristics of the human eye, the present disclosure provides a method that combines a bionic eye with visual SLAM and constructs a bionic binocular active visual SLAM system by using a channel self-attention mechanism.

To address the technical problems mentioned above, the present disclosure employs the following technical solution: a bionic binocular dense active visual SLAM system, where dense mapping is implemented using deep learning, and includes the following steps:

S1: Construct a binocular active visual system. Based on peripheral and central vision mechanisms of a human eye, peripheral vision is simulated using a panoramic camera, and a panoramic value map is constructed based on the panoramic camera, to guide active gaze control for two bionic eyes. Additionally, a binocular bionic eye gaze control strategy based on the panoramic value map is proposed.

S2: Design a SLAM algorithm framework which is improved based on an ORB-SLAM2 algorithm and suitable for motion of the two bionic eyes, where relative pose optimization of left and right cameras based on a Perspective-n-Point (PnP) algorithm and depth calculation for binocular matching points based on triangulation are adopted in a SLAM tracking thread.

S3: A self-supervised depth estimation network based on a channel attention mechanism, trained with the assistance of camera poses estimated by the SLAM system and sparse landmark point coordinates, provides dense depth estimation for a mapping module, achieving dense mapping.

Furthermore, the specific process for constructing a binocular active visual system in step S1 includes:
(1) simulating peripheral vision of the human eye using a panoramic camera to capture scene information from a 360° surrounding environment, and in an acquired panoramic image, detecting key information, feature points, and dynamic objects that impact the accuracy and robustness of SLAM operation;
(2) evaluating a surrounding scene captured in the panoramic image based on the detected information to guide a control module for binocular bionic eye cameras to shift gaze to a high-value scene and capture a high-value image as an input for SLAM;
(3) designing an active gaze control method: first, calculating projection of an area that the two bionic eye cameras are gazing at in the panoramic value map; then, evaluating a value of a scene in the currently gazed area in the projected gaze area within the panoramic image, and using the projected gaze area as a reference to search for a higher-value target gaze area in the panoramic value map; and finally, calculating motion required to move the current gaze area of the left and right bionic eye cameras to the target gaze area, and guiding the binocular bionic eye cameras to shift gaze.

Furthermore, the specific process of designing the SLAM algorithm which is improved based on ORB-SLAM2 and suitable for bionic eye motion characteristics in step S2 includes:

(1) a tracking thread: tracking each frame by matching feature points with a local map and estimating camera poses by minimizing a re-projection error using the PnP algorithm;

(2) a local mapping thread: managing the local map and executing local Bundle Adjustment (BA) optimization;

(3) a loop closure thread: detecting large-scale loops based on DBoW2 and correcting accumulated camera trajectory errors by executing pose graph optimization; and (4) a global BA thread, initiated after the pose graph optimization is completed, to obtain globally consistent camera poses and map structure.

Furthermore, in step S3, the process of training the self-supervised depth estimation network based on the channel attention mechanism with the assistance of the camera poses estimated by the SLAM system and the sparse landmark point coordinates, and transforming, by a dense mapping module, dense depth into maps that fulfill navigation and obstacle avoidance tasks specifically includes:

(1) Network structure: A self-supervised depth estimation network based on the channel self-attention mechanism is designed using a U-Net architecture. After encoding in an encoder, the designed network incorporates a structure-aware module that employs a self-attention mechanism to capture long-range dependencies and aggregate discriminative features in a channel dimension, explicitly enhancing scene structure perception and obtaining better scene understanding and rich feature representation. A detail emphasis module is added to a decoder to re-calibrate channel feature maps, selectively emphasize informative features, highlight crucial local detail information, and more effectively fuse features at different levels, achieving more accurate and clear depth predictions.

(2) Self-supervised training process: Based on a relative pose between a target image frame and a neighboring frame or the other camera in the binocular cameras, the self-supervised depth estimation network projects and reconstructs a target image by using a predicted dense depth map of the target image and the relative pose between frames, then calculates a photometric re-projection error between the target image and the reconstructed target image, and minimizes the photometric re-projection error during training. In the present disclosure, the task of camera pose estimation during training of the self-supervised depth estimation network is delegated to the SLAM system, rather than a pose estimation network.

(3) Mapping module: The self-supervised depth estimation network based on the channel attention mechanism, trained with the assistance of SLAM information, can estimate a dense depth map of a scene observed by the binocular bionic eye cameras during the operation of the binocular active visual SLAM system of the bionic eyes. In the present disclosure, a two-dimensional depth map is used to construct a dense three-dimensional map based on an octree mapping approach. Octree mapping is a map representation method that can express spatial occupancy information, handle dynamic objects in a scene, and compactly represent the scene.

Compared to existing methods, the present disclosure has the following advantages: 1) The present disclosure proposes a binocular active visual system based on peripheral and central vision mechanisms of the human eye. During SLAM tasks, the binocular cameras consistently focus on a high-value area, enhancing the system's ability to acquire high-value information in the scene. This approach mitigates the issue of tracking loss in the SLAM system when the cameras capture images with sparse textures or numerous dynamic objects, thus improving the stability of the SLAM system. 2) The present disclosure proposes a self-supervised depth estimation network based on the channel attention mechanism, which is trained with the assistance of camera poses estimated by the SLAM system and sparse landmark points. On the one hand, the self-supervised depth estimation network based on the channel self-attention mechanism includes a structure-aware module and a detail emphasis module. The structure-aware module can help obtain a better scene understanding and richer feature representation, and the detail emphasis module can highlight crucial local detail information, forming depth maps with higher accuracy, thereby improving the subsequent mapping effect in SLAM. On the other hand, using sparse landmark points obtained by the SLAM system for network pre-training reduces optimization complexity of the network and alleviates slow convergence. In addition, using camera poses obtained by SLAM for target image reconstruction avoids joint optimization using a depth estimation network and a pose estimation network, and it is only necessary to optimize a depth estimation network, reducing the burden of network training and the complexity of network learning.

DETAILED DESCRIPTION OF THE EMBODIMENTS

The present disclosure will be described in detail below with reference to the drawings and specific embodiments. The embodiments are implemented on the premise of the technical solutions of the present disclosure. The following presents detailed implementations and specific operation processes. The protection scope of the present disclosure, however, is not limited to the following embodiments.

Figure 1:
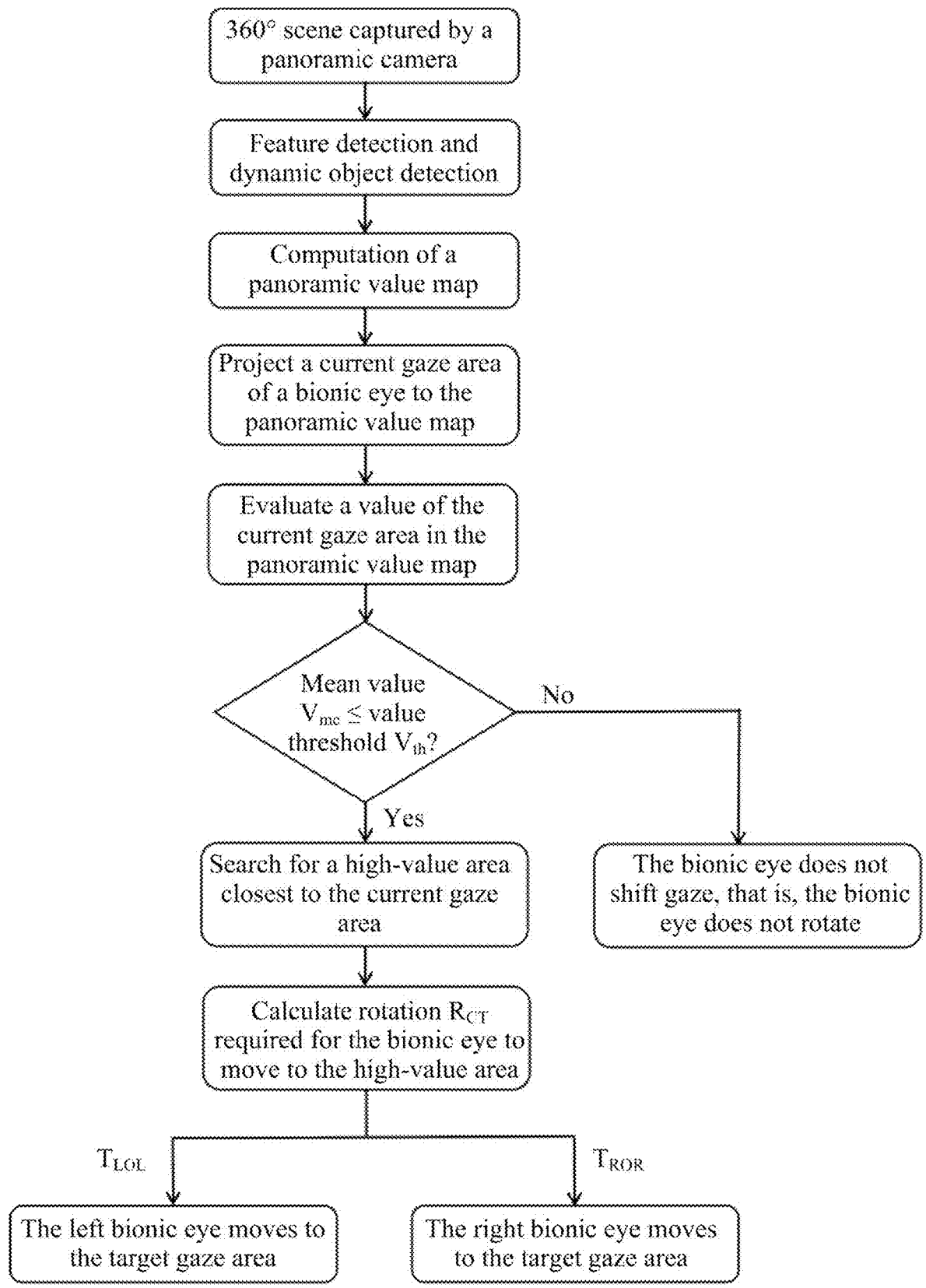
FIG. 1 is a flowchart of a design process of a binocular active visual system based on human eye visual characteristics.

Referring to the flowchart shown in FIG. 1, the present disclosure provides a binocular active visual system. The method includes the following steps:

Step S1(1): Simulate peripheral vision of a human eye using a panoramic camera to capture scene information from a 360° surrounding environment, and in an acquired panoramic image, detect key information, feature points, and dynamic objects that impact the accuracy and robustness of SLAM operation.

Feature point extraction is performed using a Features from Accelerated Segment Test (FAST) keypoint detection algorithm. Since the panoramic value map does not require feature matching, the calculation of Binary Robust Independent Elementary Features (BRIEF) descriptors in Oriented FAST and Rotated BRIEF (ORB) feature points extracted by the SLAM algorithm is omitted.

FAST is a corner detection algorithm known for its high speed, primarily detecting places with significant local pixel intensity variations. It is based on the idea that if a pixel is significantly different from pixels in the vicinity (the pixel could be excessively bright or dark), this pixel is more likely to be a corner. The detection process is as follows:

1. Select a pixel p in the image, where its intensity is assumed to be $I_p$.
2. Set a threshold T (e.g., 20% of $I_p$).
3. Select a circle of 16 pixels around the pixel p, with a radius being 3.
4. If there exist N contiguous pixels on the selected circle which are all brighter than $I_p+T$, or all darker than $I_p-T$, consider the pixel p as a feature point (usually, N is set to 12, i.e., FAST-12).
5. Repeat the above four steps for all the pixels.

For dynamic object detection, a YOLO v7 detection algorithm is used to detect, in the panoramic image, dynamic objects like pedestrians and animals or potential dynamic objects that could have a negative impact on the map reuse.

Step S1 (2): Evaluate a surrounding scene captured in the panoramic image based on the detected information to guide a control module for two bionic eye cameras to shift gaze to a high-value scene and capture a high-value image as an input for SLAM.

Figure 2:
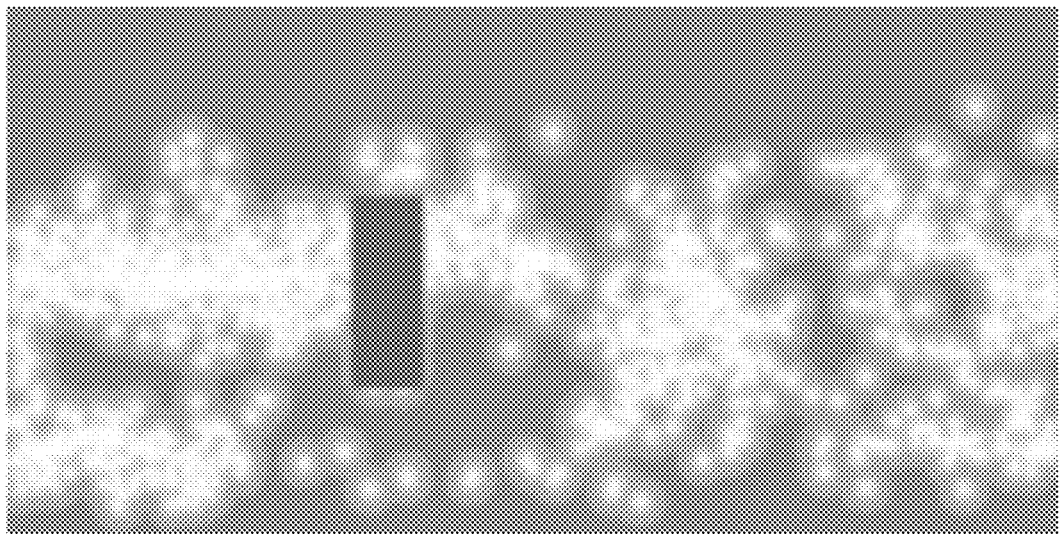
FIG. 2 illustrates a computed panoramic value map, where the empty rectangle represents a detected dynamic object, and all pixels are assigned a low value.

For the feature points extracted from the panoramic image, higher values are assigned to the feature points and surrounding neighborhood pixels. The values gradually decrease as the radius of the neighborhood increases. In an area with concentrated feature points, if a pixel is assigned values multiple times, the value of the pixel is set to a maximum value assigned. For a dynamic object that seriously degrades the performance of the SLAM algorithm, all pixels in a detection target box for the dynamic object are assigned low values, even lower than that of an area where no feature points are detected. The panoramic value map is calculated based on the detected feature points and dynamic objects in the captured panoramic images, as shown in FIG. 2.

Step S1 (3): Project an area gazed by the two bionic eye cameras onto the panoramic value map, where a bionic eye motion control module controls motion of the left and right bionic eye cameras to align fields of view of the two cameras as closely as possible, that is, the two cameras approximately focus on a same scene area.

Using projection of the field of view of the left bionic eye camera on the panoramic value map as an example, projection of the gaze area of the binocular bionic eye cameras in the panoramic value map is derived.

First, projection of four corner pixels in a pixel plane of the left bionic eye camera: $u_{L(0,0)}$, $u_{L(m,0)}$, $u_{L(m,n)}$, and $u_{L(0,n)}$ (where m and n are maximum pixel coordinates in W and H directions of the pixel plane of the bionic eye camera), on a normalized plane is calculated:

$$P_{L(0,0)} = \rho_{CN}^{-1}(u_{L(0,0)}), \quad P_{L(m,0)} = \rho_{CN}^{-1}(u_{L(m,0)})$$
$$P_{L(m,n)} = \rho_{CN}^{-1}(u_{L(m,n)}), \quad P_{L(0,n)} = \rho_{CN}^{-1}(u_{L(0,n)})$$

$\rho_{CN}(\cdot)$ represents a normalized plane projection equation of the bionic eye camera. The four projected coordinates are transformed into a coordinate system of the panoramic camera:

$$P_{P(0,0)} = T_{LOP}^{-1} T_{LOL} P_{L(0,0)}, \quad P_{P(m,0)} = T_{LOP}^{-1} T_{LOL} P_{L(m,0)}$$
$$P_{P(m,n)} = T_{LOP}^{-1} T_{LOL} P_{L(m,n)}, \quad P_{P(0,n)} = T_{LOP}^{-1} T_{LOL} P_{L(0,n)}$$

$T_{LOP}$ represents a pose of the panoramic camera relative to a coordinate system of the left bionic eye camera, and this transformation matrix is obtained through calibration. $T_{LOL}$ represents a current pose of the left bionic eye camera relative to an initial pose coordinate system thereof, and this transformation matrix is obtained through a feedback control module of the bionic eye camera.

In the coordinate system of the panoramic camera, the origin of the coordinate system of the left bionic eye camera is connected with $P_{P(0,0)}$, $P_{P(m,0)}$, $P_{P(m,n)}$, and $P_{P(0,n)}$ respectively, constructing four lines: $L_{P1}$, $L_{P2}$, $L_{P3}$, and $L_{P4}$, which represent projection of the four corners of the field of view of the left bionic eye camera. A linear equation of the four lines are:

$$\frac{x_{Pi} - x_{PL0}}{a_i} = \frac{y_{Pi} - y_{PL0}}{b_i} = \frac{z_{Pi} - z_{PL0}}{c_i}, (i = 1, 2, 3, 4)$$

In a panoramic camera projection model, a normalized sphere is defined for spherical projection, with a spherical equation as follows:

$$x^2 + y^2 + z^2 = 1$$

By solving the above linear equation and the spherical equation, intersection points $P_{P1}$, $P_{P2}$, $P_{P3}$, and $P_{P4}$ of the four lines representing the projection and the spherical projection sphere of the panoramic camera. Each line intersects the sphere at two points, but because the bionic eye camera is limited in its range of motion and cannot observe scenes within a range of $x<0$ in the coordinate system of the panoramic camera, only the four intersection points where $x>0$ are retained.

The four intersection points where x>0 are connected, forming projection of the field of view of the left bionic eye camera in the spherical model of the panoramic camera (i.e., a gaze area of the bionic eye camera within the range of the panoramic camera). The four intersection points are projected onto a pixel plane of the panoramic camera using a spherical-to-pixel plane projection equation $\rho_{B \to I}(\bullet)$ of the panoramic camera:

$$u_{Pi} = \rho_{B \to I}(P_{Pi}), \ (i=1,2,3,4)$$

The four projected points on the pixel plane of the panoramic camera are connected. Due to distortion in the projection process of the panoramic camera, the resulting shape is an irregular quadrilateral. This quadrilateral area represents the projection of the field of view of the left bionic eye camera in the panoramic image. The projection of the field of view of the right bionic eye camera can be calculated using the same method.

Figure 3:
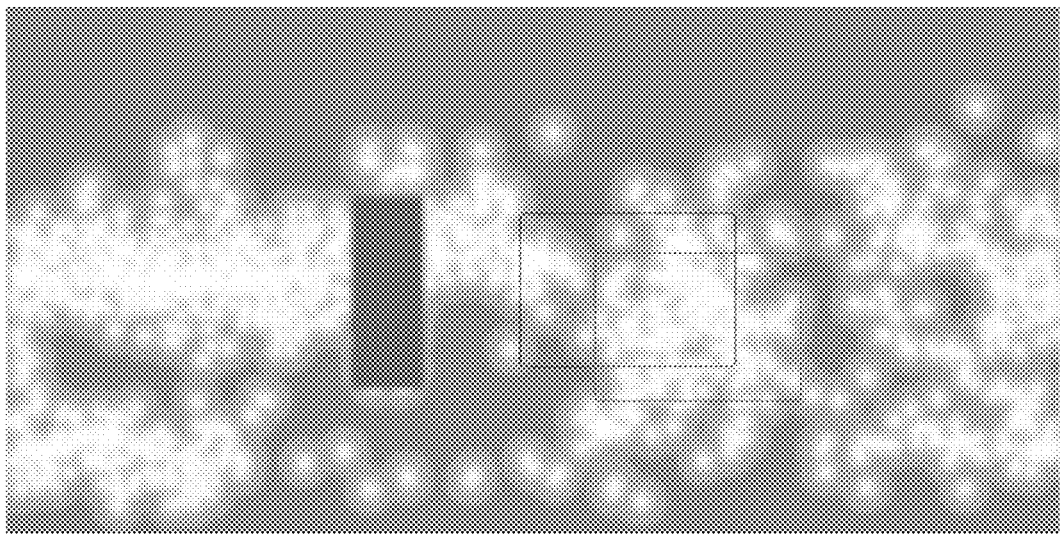
FIG. 3 is a schematic diagram of gaze control guiding in a panoramic value map, where the left rectangular box represents projection of a current gaze area of left and right bionic eyes, and the right rectangular box represents a target gaze area with a value higher than a value threshold and closest to the current gaze area within the scene.

An integration of the projection of the fields of view of the left and right bionic eye cameras results in projection of the gaze area of the left and right bionic eyes in the panoramic value map. The integrated gaze area projection is approximated to its maximum bounding rectangle. The integrated gaze area projection of the left and right bionic eyes is indicated by the left rectangular box in FIG. 3.

Next, a value of a scene in the current gaze area is evaluated in the projected gaze area in the panoramic image, and with the projection of the current gaze area as a reference, a target gaze area with a higher value is searched for in the panoramic value map.

A rectangular box with the same size as the projection of the current gaze area of the left and right bionic eye cameras is used as a window in a viewable area of the panoramic image. Starting from the projection of the current gaze area, searching is performed from near to far with a step size s, and a mean value $V_{mc}$ within the window is calculated. A target gaze area with a higher value than the current gaze area and a closest distance can be found.

To enable the motion control module to make accurate motion decisions, a value threshold $V_{th}$ is defined in the system. The threshold is selected based on the number of successfully tracked feature points during the operation of the SLAM algorithm. If the mean value $V_{mc}$ of the current gaze area is greater than $V_{th}$, it means that the value of the scene in the current gaze area is sufficient for the stable operation of the SLAM algorithm. Even if the gaze area is moved to an area with a higher mean value $V_{mc}$, the improvement may be limited, and it may even affect the performance of SLAM due to motion-induced jitter. In this case, a gaze shift motion is omitted. If the mean value $V_{mc}$ of the current gaze area is less than or equal to $V_{th}$, it means that the value of the scene in the current gaze area is not sufficient to support the stable operation of the SLAM algorithm. This may be due to a lack of extractable feature points in the scene or the presence of dynamic objects in the scene. In this case, the gaze is shifted to the target gaze area with a value higher than the value threshold $V_{th}$ and a closest distance to the current gaze area, as shown in the right rectangular box in FIG. 3.

Finally, motions required to shift the current gaze area of the left and right bionic eye cameras to the target gaze area are calculated, the gaze area of the binocular bionic eye cameras is adjusted to achieve gaze shifting.

The motion of the bionic eye camera is composed of a motor controlling a yaw angle of the camera and a motor controlling a pitch angle of the camera. The motion of the bionic eye camera on a robot platform is purely rotational and does not involve translation. Taking the calculation of the motion of the left bionic eye camera as an example, a current pose and a target pose of the left bionic eye are calculated, and then the rotation between the two poses is calculated.

First, using the spherical-to-pixel plane projection equation $\rho_{B \to I}(\bullet)$ of the panoramic camera, center pixel coordinates $u_{PT}$ of the target gaze area in the panoramic value map are back-projected onto the spherical plane, and a spherical point is transformed into the initial pose coordinate system of the left camera to obtain a pose of the left bionic eye $P_{LOT}$.

$$P_{LOT} = T_{LOP} \rho_{B \to I}^{-1}(u_{PT})$$

$P_{LOT}$ represents a target pose that the left bionic eye camera needs to reach in order to move the field of view of the left bionic eye camera to the target gaze area in the panoramic value map; and $u_{PT}$ represents the center pixel coordinates of the target gaze area in the panoramic value map.

Next, using normalized plane projection equation of the bionic eye camera $\rho_{CN}(\bullet)$, a center point $u_{LC}=[m/2, n/2]^T$ of the pixel plane of the left bionic eye camera is back-projected onto the normalized plane.

$$P_{LOC} = T_{LOL} \rho_{CN}^{-1}(u_{LC})$$

$P_{LOC}$ represents a current pose of the left bionic eye camera in the initial pose coordinate system; and $u_{LC}$ represents the center of the pixel plane of the left bionic eye camera.

Using the obtained current pose and target pose of the left bionic eye, a rotation matrix $R_{CT}$ between the two poses is calculated. According to the definition of cross product, a rotation axis of the rotation between two vectors is as follows:

$$n_{CT} = \frac{P_{LOC} \times P_{LOT}}{\|P_{LOC} \times P_{LOT}\|}$$

As the rotation axis in the rotation vector is a unit vector, the resulting vector after the cross product in the foregoing equation is normalized. For the rotation angle:

$$\theta_{CT} = \arccos \frac{P_{LOC} \cdot P_{LOT}}{\|P_{LOC}\| \|P_{LOT}\|}$$

Based on the rotation axis $n_{CT}$ and the rotation angle $\theta_{CT}$ of the rotation vector, the rotation matrix $R_{CT}$ is obtained using the Rodrigues formula:

$$R_{CT} = \cos\theta_{CT} I + (1 - \cos\theta_{CT}) n_{CT} n_{CT}^T + \sin\theta_{CT} \hat{n}_{CT}$$

In this way, the rotation $R_{CT}$ required to move the field of view of the left bionic eye camera to the target gaze area in the panoramic value map can be calculated. Similarly, the rotation required for the right bionic eye camera can also be calculated. Using this method, the rotational motions needed to shift the gaze area of the left and right bionic eye cameras to the target area can be obtained. The bionic eye control module sends rotation commands to the control motors of the left and right bionic eye cameras, ensuring that the left and right bionic eye cameras accurately shift their gaze to the high-value area in the scene.

Figure 4:
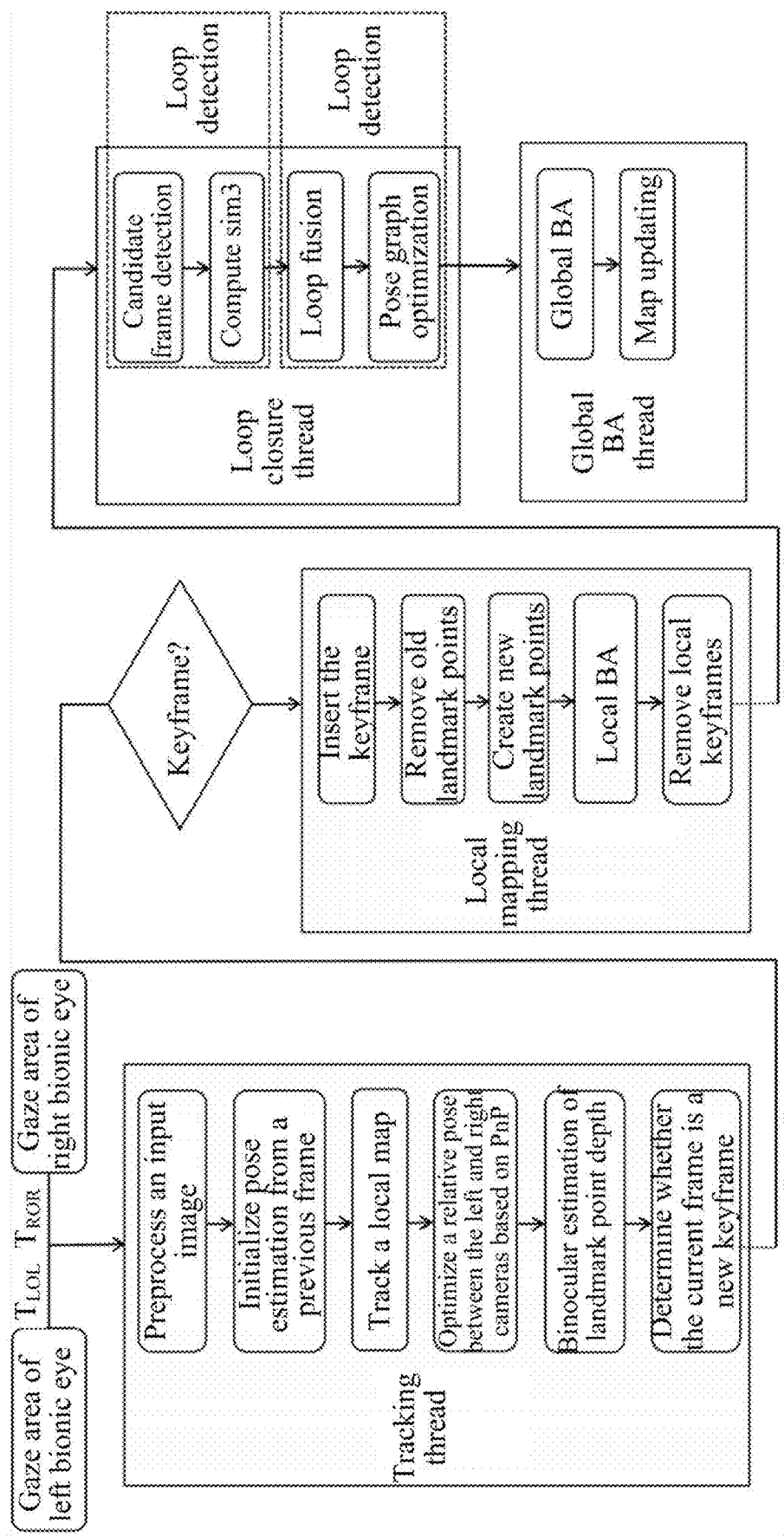
FIG. 4 is a diagram of a SLAM algorithm framework improved based on ORB-SLAM2 and suitable for bionic eye motion characteristics.

Referring to FIG. 4, the SLAM algorithm which is suitable for bionic eye motion characteristics and improved based on ORB-SLAM2 proposed in the present disclosure includes the following steps:

Step S2 (1): A tracking thread: track each frame by matching feature points with a local map and estimate camera poses by minimizing a re-projection error using the PnP algorithm. The main tasks of the tracking thread include extracting feature points from a preprocessed image, estimating camera pose based on feature matching, computing depth of landmark points, and determining whether the current frame is a keyframe.

First, ORB feature points are extracted from preprocessed input images. After images captured by the left and right bionic eye cameras are inputted into the SLAM algorithm framework, ORB feature points of the two images are extracted in a preprocessing module. Inputted original image data is then discarded, and all subsequent algorithm operations are based on the extracted ORB feature points. The image representation is transformed from a collection of pixels to a collection of ORB feature points, reducing the volume of data buffered during the operation. The extraction of ORB feature points can be implemented using OpenCV, specifically including detecting locations of Oriented FAST keypoints and then computing BRIEF descriptors based on the keypoint locations.

Furthermore, the left bionic eye camera is defined as a primary camera for camera pose initialization. Camera pose initialization is carried out using a constant velocity model. Assuming that the camera motion is uniform and the relative motion between frames remains constant, a pose of a frame at current time t is initialized according to frame t−1 based on a relative pose between frame t−2 and frame t−1. Since the initialization of pose assumes uniform camera motion, while actual cameras don't move uniformly, this assumption is relatively coarse, and pose estimation optimization needs to be optimized by tracking the local map. Feature points matching ORB feature points of the current frame of the left camera are searched for in the local map, and then a PnP problem is constructed to minimize the re-projection error, thereby optimizing the pose of the left camera.

Moreover, due to the relative motion between the left and right bionic eye cameras in the designed bionic eye SLAM system, the depth of binocular landmark points cannot be accurately determined using binocular disparity. Therefore, the present disclosure employs binocular matching. Based on feature point matching between the left and right cameras and relative poses of the left and right cameras, triangulation is performed for depth calculation, and then landmark points are built. During the initialization of binocular SLAM, the left and right bionic eye cameras stay in their initial poses. At this point, disparity is directly calculated according to a calibrated pose $T_{LORO}$ between initial coordinate systems of the left and right bionic eye cameras and based on binocular matching, thereby obtaining the depth of binocular landmark points, to form an initial local map.

The binocular SLAM initialization process is very short and can be completed with just one frame when there are enough feature points. However, as the need arises to supplement landmark points during the tracking process, the relative pose between the left and right bionic eye cameras has changed due to the control by the active visual system. It is necessary to estimate the relative pose $T_{LR}$ between the left and right cameras.

First, an initial value of the relative pose between the left and right bionic eye cameras during motion is first calculated by using poses of the left and right bionic eye cameras relative to their respective initial coordinate systems, i.e., $T_{LOL}$ and $T_{ROR}$, as well as the pose $T_{LORO}$ between the initial coordinate systems of the left and right bionic eye cameras:

$$T_{LR} = T_{LOL}^{-1} T_{LORO} T_{ROR}$$

Figure 5:
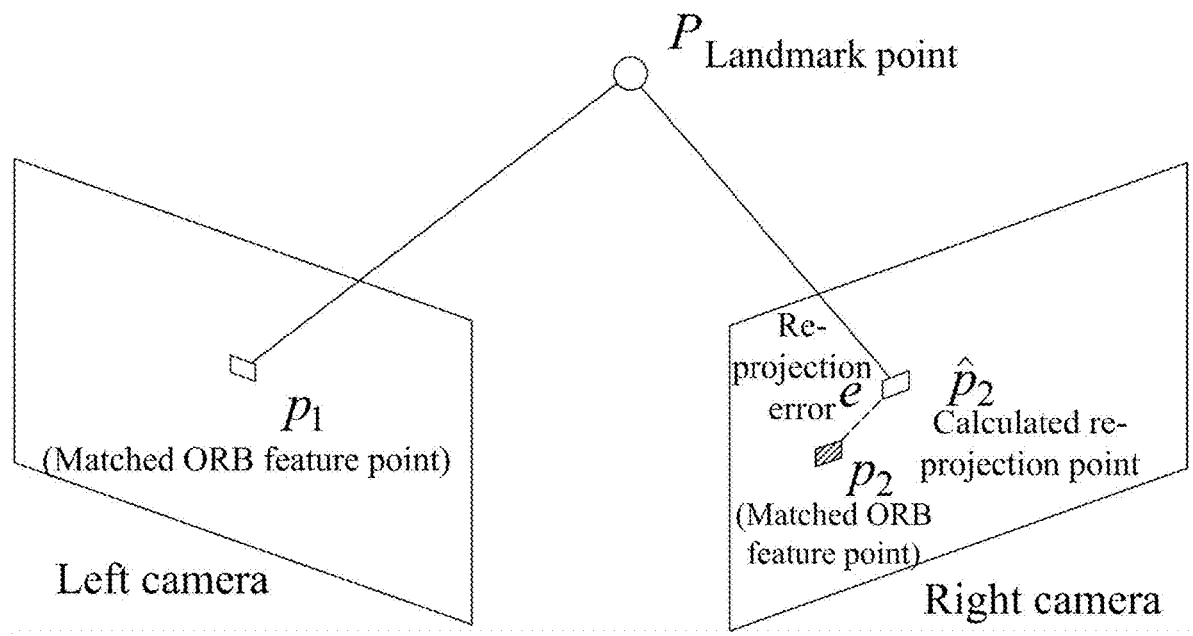
FIG. 5 is a schematic diagram of minimizing a left and right camera re-projection error.

Then, as shown in FIG. 5, based on ORB feature point matches between the left and right cameras and the matches between ORB feature points in the left camera and landmark points, a PnP problem is constructed to minimize the re-projection error of feature points of the right camera, thereby optimizing the relative pose between the left and right cameras to a more accurate $T_{LR}$.

Using the optimized relative pose $T_{LR}$ between the left and right bionic eye cameras and the matched ORB feature points in the images, triangulation is performed to obtain a large number of high-quality landmark points. These landmark points serve as a supplement for landmark points in the local map, significantly improving the accuracy and robustness of the tracking thread.

Finally, keyframe selection conditions are set to determine whether to set the current frame as a keyframe. If the current frame meets any of the following conditions, the current frame is set as a keyframe:

1. The current frame is the first frame after the bionic eye gaze reaches the target gaze area under control.
2. More than 13 frames have passed since the last global re-localization.
3. The local mapping thread is in an idle state.
4. More than 15 frames have passed since the last keyframe is set.
5. A translation distance between the current frame and the last keyframe exceeds a threshold value, $t_{th}$.
6. The number of successfully tracked feature points in the current frame is greater than 70.
7. The number of successfully tracked feature points in the current frame is less than 85% of the number of feature points in a reference keyframe.

Step S2 (2): A local mapping thread: manage the local map and execute local BA optimization, aimed at updating and maintaining landmark points and keyframes in the local map and conducting local BA optimization to optimize both poses of the keyframes and coordinates of the landmark points.

First, the keyframes in the local map are updated. Once the tracking thread determines to set the current frame as a keyframe, an association with the new keyframe is established based on mutual visibility of landmark points between the new keyframe and the preceding keyframes, and a bag-of-words (BoW) representation of the new keyframe is calculated using a distributed bag-of-words (DBoW) model.

Furthermore, the landmark points in the local map are updated and maintained. If a landmark point needs to remain in the local map, it must meet the following two conditions within the first three keyframes after its creation: 1. In frames where the landmark point is visible, which are predicted based on the pose, over 25% of keyframes need to be successfully tracked. 2. If more than one keyframe has been added after the creation of the landmark point, the landmark point must be observed by at least three keyframes. After meeting the two conditions, the landmark point will only be removed if observed by fewer than three keyframes subsequently.

A new landmark point is created based on the mutual visibility between keyframes, using ORB feature matching and depth calculation through triangulation. Once the depth is calculated through triangulation, the new point undergoes checks for positive depth and re-projection error.

Figure 6:
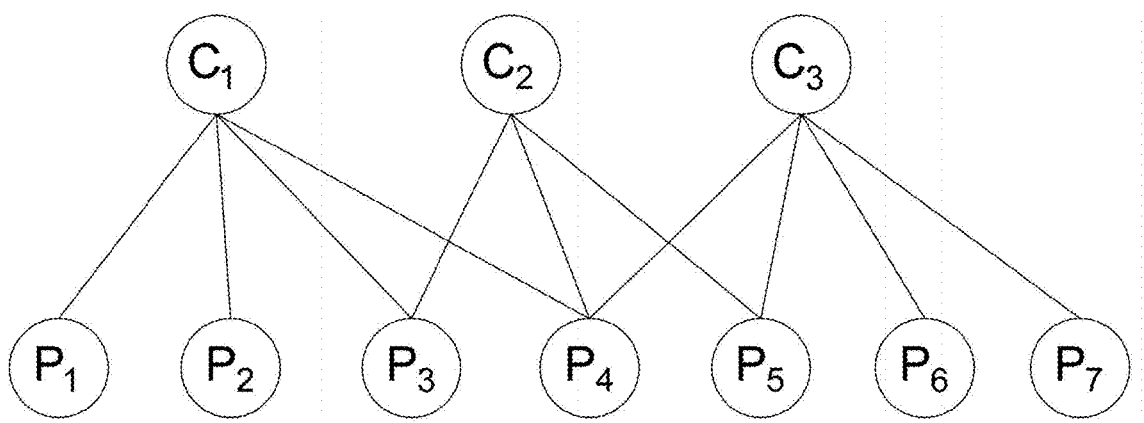
FIG. 6 is a schematic diagram of BA optimization.

Moreover, local BA optimization essentially constructs a PnP problem. However, in this optimization, the coordinates of the landmark points are added as optimization parameters. As shown in FIG. 6, BA is explained from the perspective of graph optimization. In the figure, circles $C_1$, $C_2$, and $C_3$ represent camera pose nodes, denoting camera pose parameters to be optimized; circles $P_1$, $P_2$ ... $P_7$ represent landmark point nodes, denoting to-be-optimized three-dimensional coordinate parameters of the landmark points. The connections between nodes represent error terms defined in nonlinear optimization, with the error term formulated as:

$$e = u_2 - \frac{1}{s_2} K T_{21} P$$

$u_2$ denotes observed coordinates of a 3D point P, and e represents an error between projected coordinates and observed coordinates of the 3D point P, namely, the re-projection error.

During iterative optimization, the derivative of the re-projection error e concerning the camera pose is obtained as follows:

$$\frac{\partial e}{\partial \delta \xi} = -\begin{bmatrix} \frac{f_x}{Z'} & 0 & -\frac{f_x X'}{Z'^2} & -\frac{f_x X'Y'}{Z'^2} & f_x + \frac{f_x X'^2}{Z'^2} & -\frac{f_x Y'}{Z'} \\ 0 & \frac{f_y}{Z'} & \frac{f_y Y'}{Z'^2} & -f_y - \frac{f_y Y'^2}{Z'^2} & \frac{f_y X'Y'}{Z'^2} & \frac{f_y X'}{Z' \square} \end{bmatrix}$$

$\delta \xi$ represents a left perturbation of a camera pose T, and X', Y', Z' represent coordinates of the 3D point transformed to the camera coordinate system.

Further, the derivative of the re-projection error e concerning the 3D point P is obtained as follows:

$$\frac{\partial e}{\partial P} = -\begin{bmatrix} \frac{f_x}{Z'} & 0 & -\frac{f_x X'}{Z'^2} \\ 0 & \frac{f_y}{Z'} & -\frac{f_y Y'}{Z'^2} \end{bmatrix} R$$

R is a rotation matrix in the camera pose.

Once the derivatives of the re-projection error e concerning the camera pose T and the spatial coordinates of the feature point P are obtained, during target function optimization using Gauss-Newton or Levenberg-Marquardt methods, gradient directions are provided to guide the updates of the optimization variables, i.e., the camera pose T and the spatial coordinates of the feature point P. As the objective function error converges during iteration, the optimal keyframe camera pose and landmark point coordinates in the local map can be obtained.

Finally, local keyframes are removed. When 90% of landmark points within a keyframe can be observed in at least three other keyframes, this keyframe is deemed redundant and discarded. Failing to limit the number of keyframes would result in an increasingly large dataset in local BA, slowing down optimization and affecting the real-time performance of local mapping.

Step S2 (3): A loop closure thread: detect large-scale loops based on DBoW2 and correct accumulated camera trajectory errors by executing pose graph optimization. First, loops are detected based on DBoW2 to find loop closure candidate keyframes, and a relative pose between the current keyframe and the loop closure candidate keyframe is calculated. Loop closure is performed based on mutual visibility. Using the previously computed relative pose between the current keyframe and the loop closure keyframe, the loop is corrected, and pose graph optimization is performed.

Pose graph optimization focuses solely on optimizing camera poses. In the pose graph, the nodes are camera pose nodes, and an edge connecting nodes represents an estimate of a relative pose between two camera pose nodes. Initial values of the pose nodes are camera poses of keyframes before loop correction. The edges represent relative poses between camera poses of keyframes computed after loop correction. Assuming there are two keyframes $K_i$ and $K_j$, with camera poses $T_{Wi}$ and $T_{Wj}$ before loop correction, and a relative pose $T_{ij}$ between $K_i$ and $K_j$ obtained after correction of keyframe camera poses in the loop during loop fusion, an error $e_{ij}$ is as follows:

$$e_{ij} = T_{ij}^{-1} T_{Wi}^{-1} T_{Wj}$$

Based on this error, a nonlinear optimization problem is constructed, and the derivatives of the error term with respect to $T_{Wi}$ and $T_{Wj}$ are computed for linearization. This allows for the optimization of the pose graph.

Step S2 (4): A global BA thread, which is initiated to obtain globally consistent camera poses and map structure. After the loop closure thread completes pose graph optimization, global BA optimization is executed in a separate thread is to obtain a globally optimal solution. If a new loop is detected during the global BA optimization process, the global BA thread is terminated. The global BA thread is restarted after pose graph optimization in the loop closure thread is finished. After the global BA thread completes optimization, the updated keyframe camera poses are merged with non-updated keyframe camera poses using a generated tree. The coordinates of landmark points are corrected based on updates to their reference keyframe camera poses.

Figure 7:
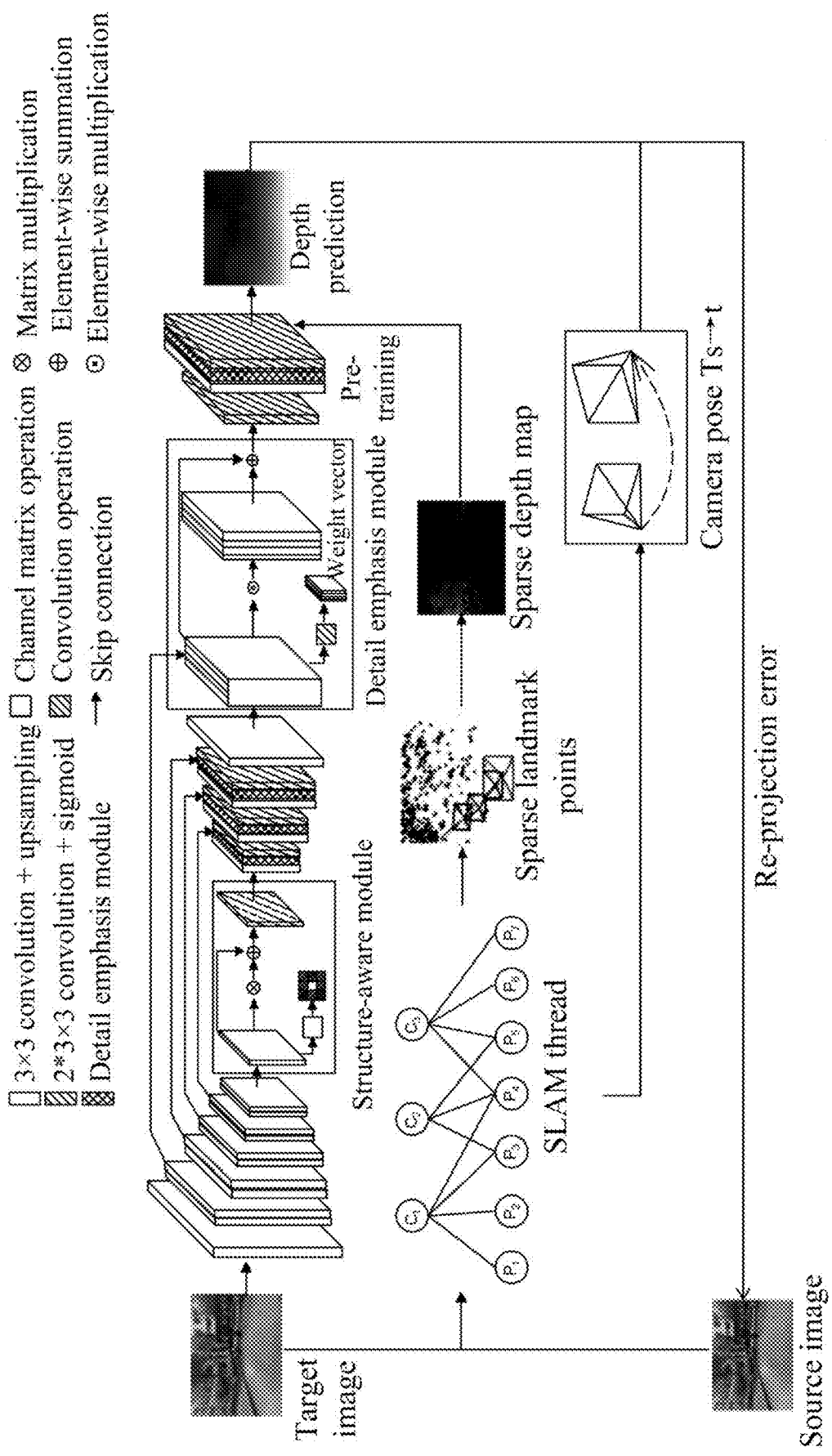
FIG. 7 illustrates a structure of a self-supervised depth estimation network based on a channel attention mechanism, which is trained with the assistance of SLAM information.

The self-supervised depth estimation network, based on the channel self-attention mechanism and trained with the assistance of SLAM information, proposed in the present disclosure is used for dense mapping in the SLAM system. The method includes the following steps:

Step S3 (1): Design a self-supervised depth estimation network based on the channel self-attention mechanism using a fully convolutional U-Net architecture. As shown in FIG. 7, the network in the present disclosure uses a fully convolutional U-Net architecture. An encoder utilizes a ResNet-18 network as a backbone to extract semantic features. These features are then inputted into a structure-aware module to generate new features, which explicitly enhances the perception for a scene structure. Additionally, in a decoder stage, spatial resolution is gradually restored, promoting the flow of gradients and information through skip connections. A detail emphasis module is used to successively generate sharp edges and finer details. Finally, nearest-neighbor interpolation is used at multiple scales to upsample a predicted inverse depth map until the original input resolution is restored, and training loss is computed under this higher input resolution.

Build a depth estimation network: a target image is inputted into a depth estimation network, which includes an encoder with a structure-aware module and a decoder with a detail emphasis module, to output a depth map of the target image.

Furthermore, the structure-aware module is specifically illustrated as follows:

In depth estimation, each high-level feature map can be seen as a region-specific response, where different region responses are interrelated. If each channel map captures more distinct region responses from all other channel maps, it will gain more relative depth information from distant regions and significantly enhance the perception for the scene structure. Therefore, an attention module is proposed to simulate interdependencies between channels and aggregate different region responses.

Figure 8:
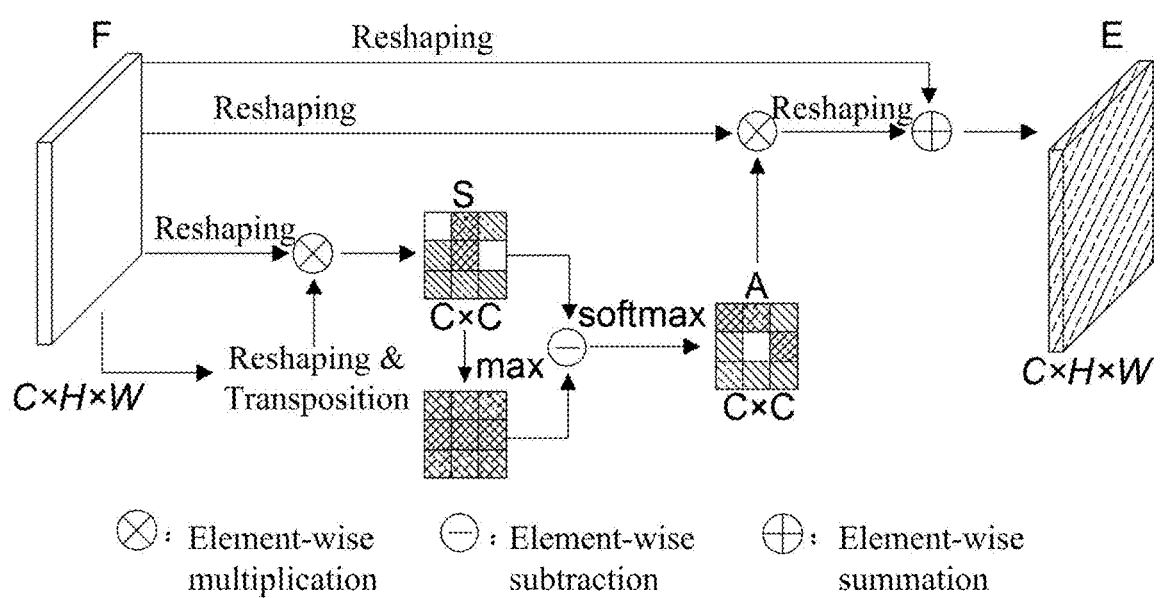
FIG. 8 is a schematic diagram of a structure-aware module in the depth estimation network based on the channel attention mechanism.

1. Generate an attention matrix to establish relationships between any two channel maps. As shown in FIG. 8, given a feature map $F \in \mathbb{R}^{C \times H \times W}$ generated by the ResNet-18 encoder, F is first reshaped into $\mathbb{R}^{C \times N}$, where N=H×W is the number of pixels. Then, F is multiplied with a transposed matrix of/to calculate a feature similarity $S \in \mathbb{R}^{C \times C}$:

$$S_{ij} = F_i \cdot F_j^T$$

2. The similarity between channel maps represents a spatial relationship of region responses, that is, a high similarity between any two feature maps means that they have a strong response for the same region. To aggregate more responses from different regions, the similarity matrix S is transformed into a distinctiveness matrix $D \in \mathbb{R}^{C \times C}$ through element-wise subtraction:

$$D_{ij} = \max_i(S) - S_{i,j}$$

$D_{ij}$ measures an influence of channel j on channel i. For each channel map, channels with distinct features (i.e., different region responses) will have higher $D_{ij}$ during feature aggregation.

3. Apply a softmax layer to obtain an attention map $A \in \mathbb{R}^{C \times C}$:

$$A_{ij} = \frac{\exp(D_{ij})}{\sum_{j=1}^{C} \exp(D_{ij})}$$

4. Multiply the attention map A with the transposed matrix of F and reshape a result into $\mathbb{R}^{C \times H \times W}$. Finally, element-wise summation is performed between F and $\mathbb{R}^{C \times H \times W}$ to obtain a final output $E \in \mathbb{R}^{C \times H \times W}$:

$$E_i = \sum_{j=1}^{C}(A_{ij}F_j) + F_i$$

This equation demonstrates that the final feature for each channel is a weighted sum of features from all channels and original features. By capturing long-range dependencies between feature maps, aggregated features containing rich contextual information about an encoding scene structure are obtained.

Furthermore, the detail emphasis module of the decoder is specifically illustrated as follows:

To recover resolution, the decoder fuses the following features at different scales: low-level information from skip connections encodes rich spatial details, while high-level information encodes more contextual information. Simple fusion operations like summation or concatenation lack further processing for local details, and ignore semantic gaps between different levels of features, resulting in blurry artifacts in the predicted depth map. The key to predicting clearer edges is handling local details correctly. If the network knows explicitly the categories and locations of features describing object boundaries, it can easily recover accurate depth predictions. Therefore, a detail emphasis module is proposed, which employs a channel attention mechanism to enable the network to focus on specific channel features, thereby highlighting important details while effectively fusing features at different scales.

1. Specifically, low-level features L and high-level features H are first concatenated. Then, a convolutional layer followed by batch normalization is applied to obtain U to balance feature scales:

$$U = \sigma(BN(W_1 \otimes f(L, H)))$$

f( ) represents concatenation, $\otimes$ represents a 3×3 or 1×1 convolution, BN represents batch normalization, and ReLU is used as the activation function $\sigma(\ )$.

2. U is compressed into a vector by global average pooling to obtain global context, and two 1×1 convolutional layers and a sigmoid function are used to calculate a weight vector $V \in \mathbb{R}^{1 \times 1 \times C}$, so as to recalibrate channel features and measure their importance:

$$V = \delta\left(W_2 \otimes \sigma\left(W_3 \otimes \frac{1}{H \times W}\sum_{i=1}^{H}\sum_{j=1}^{W}U_{i,j}\right)\right)$$

H and W are a height and a width of U, and $\delta(\ )$ represents the sigmoid function.

3. Element-wise multiplication between V and U is performed to generate re-weighted features. As weight scores in V represent the importance of corresponding channels, meaning that channel maps with key information will receive higher scores. This recalibration operation can adaptively emphasize critical details of sharp edges at multiple scales. The stability of U and the re-weighted features is as follows:

$$O = V \odot U + U$$

Figure 9:
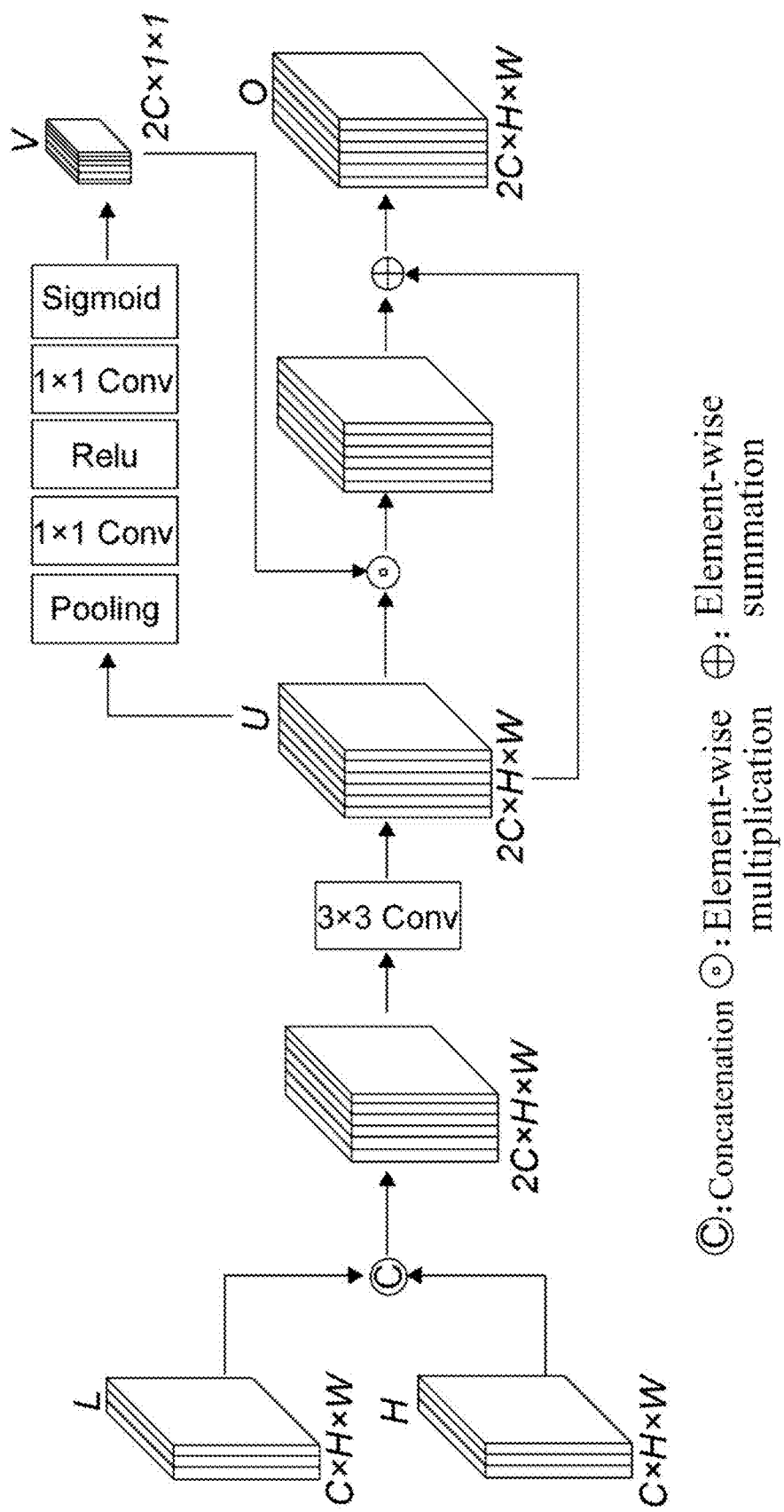
FIG. 9 is a schematic diagram of a detail emphasis module in the depth estimation network based on the channel attention mechanism.

$\odot$ denotes element-wise multiplication, and O is a final output. As shown in FIG. 9, the design of the detail emphasis module re-calibrates channel feature responses and generates depth estimation with higher accuracy.

Step S3 (2): For the binocular bionic eye cameras, since the SLAM system estimates both a relative pose between adjacent image frames of the left bionic eye camera and a relative pose between the two bionic eye cameras, the target image can be trained based on both adjacent frames and binocular frames. Based on the relative pose between the target image frame and a neighboring frame or the other one of the binocular cameras, the self-supervised depth estimation network projects and reconstructs the target image by using the predicted dense depth map of the target image and the relative pose between frames, and then constructs a re-projection error between the target image and the reconstructed target image. Therefore, a photometric re-projection loss function is defined in the network, expressing self-supervised depth estimation as a problem of minimizing the photometric re-projection error during training. The camera poses are managed by the SLAM system.

Pre-training: The target image is inputted into the SLAM thread, and using keyframe matching relationships and BA optimization in the SLAM algorithm, a sparse depth map of the target image is outputted for the pre-training of the depth network.

First, a sparse depth map is constructed using sparse landmark points that are created from the keyframe matching relationships in the SLAM algorithm and have been subject to BA optimization. This sparse depth map is used as depth annotations for the pre-training of the depth estimation network.

To construct the sparse depth map, it is necessary to obtain, for landmark points of a keyframe tracked based on feature matching between adjacent frames or mutual visibility with other keyframes, feature point pixel coordinates in the keyframe, and then set pixel values of these feature point pixel coordinates in the sparse depth map to the normalized inverse depth of the landmark points relative to the keyframe, thus obtaining sparse depth map for the pre-training of the depth estimation network. To prevent conflicts with an estimable depth range of the depth estimation network, landmark points with depths relative to the reference keyframe outside the range of [0.1, 100] need to be excluded.

Construction of a loss function: The target image and source images are inputted. The target image is projected and reconstructed based on the pose between the target image outputted by the SLAM thread and the source images as well as the depth map outputted by the depth estimation network, a photometric re-projection loss function between the target image and the reconstructed target image is calculated.

Furthermore, in the network, the target image $I_t$ is the left bionic eye camera image from a binocular bionic eye system, while the source images are a previous or next frame of left bionic eye camera image $I_s \in \{I_{t-1}, I_{t+1}\}$, and a right bionic eye camera image $I_s = I_{tr}$. A pose of the target image relative to the source image is denoted as $T_{st}$, which is obtained by the SLAM system. The ultimate objective of network training is to enable the predicted dense depth map $D_t$ in the network to minimize the photometric re-projection loss function $L_p$. During training, by minimizing the pixel-wise photometric re-projection error $L_p$, joint optimization is performed on the depth network and the poses provided by SLAM. The photometric re-projection loss function $L_p$ is defined as follows:

$$L_p = \min_s pe(I_t, I_{s \to t})$$

pe( ) represents a photometric error consisting of an L1 distance and a structural similarity (SSIM), and $I_{s \to t}$ represents a reconstructed image.

$$pe = \frac{\alpha}{2}(1 - SSIM(I_t, I_{s \to t})) + (1-\alpha)\|I_t - I_{s \to t}\|_1$$

$$I_{s \to t} = I_s \langle proj(D_t, T_{st}, K) \rangle$$

proj( ) represents 2D coordinates of projection depth $D_t$ in $I_t$; $\alpha=0.85$; $\langle \cdot \rangle$ represents a bilinear interpolation sampling operation; K represents camera intrinsics; $D_t$ represents a predicted depth map; and $T_{st}$ represents a camera pose obtained by the SLAM system.

SSIM is a metric that measures the similarity between two images, taking into account the brightness, contrast, and structural similarity between the images. The calculation formula is as follows:

$$SSIM(I_t, I_{s \to t}) = \frac{(2\mu_x\mu_y + C_1)(2\sigma_{xy} + C_2)}{(\mu_x^2 + \mu_y^2 + C_1)(\sigma_x^2 + \sigma_y^2 + C_2)}$$

$\mu_x$ and $\mu_y$ are luminance means, representing a brightness index in SSIM; $\sigma_x$ and $\sigma_y$ are luminance standard deviations, representing a contrast index; $\sigma_{xy}$ is luminance covariance, and a ratio of $\sigma_{xy}$ to a standard deviation product $\sigma_x\sigma_y$ represents a structural index. $C_1$ and $C_2$ are constants to prevent errors of denominators being 0.

Furthermore, to reduce noise and artifacts in the depth map while preserving scene edge information as much as possible, an edge-aware smoothness loss $L_s$ is further defined in the network:

$$L_s = |\partial_x d_t^*|e^{-|\partial_x I_t|} + |\partial_y d_t^*|e^{-|\partial_y I_t|}$$

$d_t^* = d_t/\overline{d_t}$ represents a mean-normalized inverse depth.

Finally, the photometric re-projection loss $L_p$ is combined with the edge-aware smoothness loss $L_s$ to serve as a final training loss function for the network:

$$L = \frac{1}{S}\sum_i^S (\mu L_p^i + \lambda L_s^i)$$

S is a scale factor, and $\lambda$ is a weight of an edge-aware smoothness loss term.

Based on the obtained photometric re-projection loss function, the depth estimation network is trained.

Camera poses corresponding to each pair of inputted target and source images are estimated using the SLAM thread.

Step S3 (3): After obtaining the dense depth map of the observed scene by using the self-supervised depth estimation network based on the channel attention mechanism, select a octree map construct a dense three-dimensional map from the two-dimensional depth map. The octree map is a compact map representation form capable of expressing spatial occupancy information and handling dynamic objects in the scene.

Construction of the octree map: The predicted depth map is inputted, and the octree map is constructed based on an occupancy probability of writing a pixel with a depth d observed in the depth map onto a corresponding spatial point.

Figure 10:
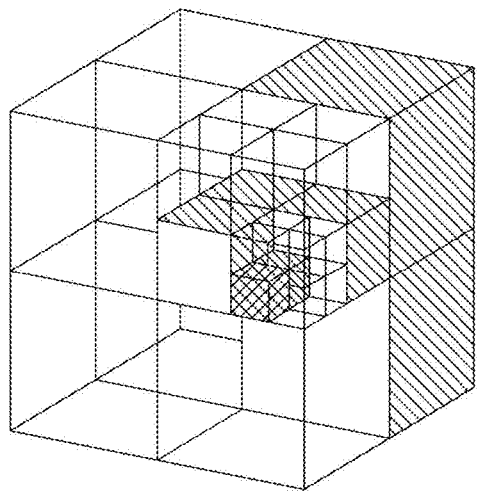
FIG. 10 is a schematic diagram of an octree.
Figure 10:
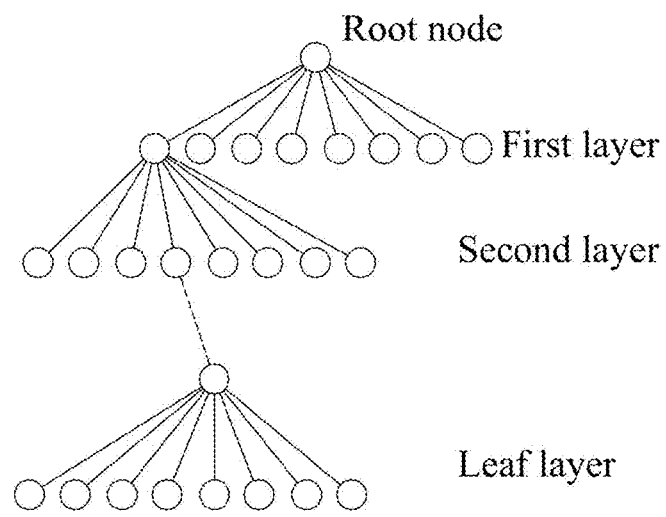

First, the octree map uniformly subdivides three-dimensional space into eight sections continuously, eventually modeling the entire space as a collection of the smallest spatial partition units (voxels). As shown in FIG. 10, a cube is continually subdivided into eight equally sized smaller cubes until small enough cubes are obtained. At this point, the original large cube becomes the root node in the octree data structure, and the smallest cube becomes a leaf node, with each of the eight smaller cubes resulting from the subdivision serving as child nodes to the subdivided cube.

In the octree map, each node stores an occupancy probability within the range [0, 1] to express its spatial occupancy information, where 0 indicates that the node is unoccupied and 1 indicates that the node is occupied. When all child nodes of a parent node have consistent occupancy information, it is unnecessary to unfold the parent node, and only the occupancy probability of the parent node needs to be stored. In the extreme case where the entire space is completely occupied, only the occupancy probability of the root node, which is 1, needs to be stored. This map representation form is much more compact compared to point cloud maps and can significantly reduce storage space.

The occupancy probability serves not only to express spatial occupancy information but is also used to dynamically model the map, making the map more accurate in representing the real scene. Every new observation updates the occupancy probabilities stored in the nodes. If a node is occupied in successive observations, the occupancy probability thereof increases; otherwise, the occupancy probability decreases. Thus, the octree map can handle dynamic changes in the scene by continuously updating node occupancy probabilities.

In practical applications, probability values cannot increase or decrease indefinitely and should be constrained to the range of [0, 1]. Therefore, the actual value stored in the node is a logit function value q of the probability p, (logarithm of the probability), that is:

$$q = \mathrm{log} it(p) = \log\left(\frac{p}{1-p}\right)$$

To query the occupancy probability, inverse transformation needs to be performed:

$$p = \mathrm{log} it^{-1}(q) = \frac{\exp(q)}{\exp(q)+1}, q \in (-\infty, +\infty)$$

With the logarithmic probabilities, the entire octree map can be updated based on depth data. If a pixel with a depth d is observed in the predicted dense depth map, it implies that an occupancy data is observed at the spatial point corresponding to that depth, and there should be no objects along a line segment from the camera center to that point (otherwise, the point would be occluded). Using this information, the octree map can be updated effectively, allowing it to handle moving structures.

Furthermore, considering the computational burden of the mapping module and the update frequency of the map, the mapping module of the SLAM system performs dense mapping only on keyframes.

Dense mapping: The depth map $D_t$ of the keyframe from the SLAM system is projected into the world coordinate system, and a point cloud representation of the observed scene in the current keyframe is outputted. The point cloud is used as an input to update the occupancy probabilities of the nodes in the octree map, to obtain a dense map for the current keyframe.

First, an input image $I_t$ from the left bionic eye camera of the keyframe and the pose $T_{wc}$ of the left bionic eye in the world coordinate system are obtained from the SLAM algorithm. The image $I_t$ is then downsampled by a factor of four and inputted into the designed deep depth estimation network based on the channel attention mechanism, to obtain the dense depth map $D_t$. Subsequently, according to a camera projection model, the pixel $u_t$ from the depth map $D_t$ is projected into three-dimensional space and transformed into the world coordinate system:

$$P_w = T_{wc}^{-1} D_t(u_t) K^{-1} u_t$$

Once pixels at all depth estimates in the dense depth map $D_t$ of the keyframe are projected into the world coordinate system, a point cloud representation of the scene observed in the current keyframe is obtained. This point cloud is inputted into the octree to update the occupancy probabilities of nodes in the octree map, achieving dense mapping for the current keyframe.

As the bionic eye camera continues to move and new keyframes are inserted, the octree map of the scene is continuously updated, resulting in a complete octree map of the explored scene ultimately. The obtained octree map stores spatial occupancy information of the scene. Moreover, through continuous updates, traces of dynamic objects are removed from the map, allowing the robot to obtain the necessary information for navigation and obstacle avoidance within the modeled scene.

The present disclosure employs an improved SLAM algorithm and a dense mapping module consisting of a self-supervised depth estimation network based on a channel self-attention mechanism to construct a binocular active visual SLAM system, aiming to enhance localization and mapping capabilities of a robot in unknown environments. The present disclosure uses pixel-wise assignment to assign higher values to feature points in the panoramic image and pixels in surrounding neighborhoods, with values gradually decreasing as the neighborhood radius increases. All pixels in a detection target box for the dynamic object are assigned low values. This results in a panoramic value map that guides bionic eyes to move to high-value areas in the panoramic value map. Using an improved ORB-SLAM2 algorithm framework and a PnP algorithm, the present disclosure designs a SLAM algorithm framework suitable for relative motion of the two bionic eyes seeking high-value areas in this system. The depth estimation network based on a channel self-attention mechanism, which contains a structure-aware module and a detail-enhancement module, estimates a depth map of a target frame. Using the depth map of the target frame (left bionic eye) and the camera pose estimated by the SLAM system, the target image is reconstructed, and the network is trained by minimizing the photometric reconstruction error. In this way, the SLAM system obtains a dense depth map. An octree map is used to transform the two-dimensional dense depth map into a dense three-dimensional map. These innovations avoid tracking loss caused by sparse image textures or presence of numerous dynamic objects, thereby improving the stability of the system during SLAM tasks. Moreover, dense maps with higher accuracy are constructed using the depth estimation network, enhancing the capability of precise localization and mapping in unknown environments. The method of the present disclosure holds significant practical value and can be widely applied in fields such as robot navigation and autonomous driving, providing strong support for technological innovation and progress in related industries.

What is claimed is:

1. A self-supervised image depth estimation method based on a channel self-attention mechanism, comprising:
    capturing images using binocular bionic eye cameras, wherein the binocular bionic eye cameras comprise a left bionic eye camera and a right bionic eye camera;
    defining one of the binocular bionic eye cameras as a primary camera, defining a primary camera image as a target image, and defining two frames of primary camera images before and after the target image and an image captured by an other one of the binocular bionic eye cameras as source images;
    inputting the images captured by the binocular bionic eye cameras into a simultaneous localization and mapping (SLAM) system, and predicting camera poses and a sparse depth map of the target image by using the SLAM system;
    inputting the target image and the sparse depth map that is obtained by a SLAM thread into a depth estimation network based on a channel self-attention mechanism architecture to obtain a scene depth map of the target image, wherein the depth estimation network based on the channel self-attention mechanism architecture comprises an encoder, a structure-aware module, and a decoder, and parameters of the depth estimation network based on the channel self-attention mechanism architecture are updated in the following manner:
    inputting the target image into the encoder, which uses a ResNet-18 network as a backbone to extract semantic features and then inputs the semantic into the structure-aware module to generate new features; inputting a new feature map generated by the structure-aware module into the decoder, wherein the decoder first performs a 3×3 convolution and upsampling on the new feature map generated by the structure-aware module, and then inputs the feature map into a detail-aware module, and the feature map obtained by the detail-aware module is further subject to two 1×1 convolutions and a sigmoid function; and obtaining a final dense depth map at original resolution after decoding;
    inputting the sparse depth map obtained by the SLAM system into a final layer structure of the decoder for pre-training the depth estimation network; and
    based on a relative pose between a target image frame and a neighboring frame or the other one of the binocular bionic eye cameras, projecting and reconstructing the target map by using the dense depth map of the target image predicted by the depth estimation network based on the channel self-attention mechanism and the relative pose between frames, then constructing a re-projection error between the target image and the reconstructed target image, and minimizing the re-projection error during training.

2. The image depth estimation method according to claim 1, wherein an operation process of the structure-aware module comprises:
    given a feature map $F \in \mathbb{R}^{C \times H \times W}$ generated by the ResNet-18 encoder, first reshaping F into $\mathbb{R}^{C \times N}$, wherein N=H×W is the number of pixels, and then multiplying F with a transposed matrix of F to calculate a feature similarity $S \in \mathbb{R}^{C \times C}$:
    $S_{ij} = F_i \cdot F_j^T$, wherein i and j represent any two channels, and $S_{ij}$ represents a feature similarity between the two channels;
    transforming the similarity matrix S into a distinctiveness matrix $D \in \mathbb{R}^{C \times C}$ through element-wise subtraction:
    $D_{ij} = \max_i(S) - S_{i,j}$, wherein $D_{ij}$ represents an influence of channel j on channel i;
    applying a softmax layer to obtain an attention map $A \in \mathbb{R}^{C \times C}$:

$$A_{ij} = \frac{\exp(D_{ij})}{\sum_{j=1}^{C} \exp(D_{ij})},$$

wherein $A_{ij}$ represents concentrating attention on specific parts of the two channels, and extracting key information from the channels while ignoring irrelevant information;
    multiplying the attention map A and the transposed matrix of F, reshaping a result into $\mathbb{R}^{C \times H \times W}$, and then performing element-wise summation between F and $\mathbb{R}^{C \times H \times W}$ to obtain a final output $E \in \mathbb{R}^{C \times H \times W}$:

$$E_i = \sum_{j=1}^{C}(A_{ij}, F_j) + F_i.$$

3. The image depth estimation method according to claim 1, wherein the detail-aware module restores the original resolution by fusing high-level features H and low-level features L from skip connections, and a specific operation process comprises:
    first concatenating the low-level features L and the high-level features H, and then applying a convolutional layer followed by batch normalization to obtain U to balance feature scales:
    $U = \sigma(BN(W_1 \otimes f(L, H)))$ wherein $f(\ )$ represents concatenation, $\otimes$ represents a 3×3 or 1×1 convolution, BN represents batch normalization, and ReLU is used as the activation function $\sigma(\ )$;
    compressing U into a vector by global average pooling to obtain global context, and using two 1×1 convolutional layers and a sigmoid function to calculate a weight vector $V \in \mathbb{R}^{1 \times 1 \times C}$ so as to recalibrate channel features and measure importance of the channel features:

$$V = \delta\left(W_2 \otimes \sigma\left(W_3 \otimes \frac{1}{H \times W} \sum_{i=1}^{H} \sum_{j=1}^{W} U_{i,j}\right)\right),$$

wherein H and W are a height and a width of U, and $\delta(\ )$ represents the sigmoid function; and
    performing element-wise multiplication between V and U to generate re-weighted features, then performing summation between the re-weighted features and U to obtain a final output O:
    $O = V \odot U + U$, wherein $\odot$ represents element-wise multiplication.

4. The image depth estimation method according to claim 1, wherein the left bionic eye camera is defined as the primary camera, the target image $I_t$ is a left bionic eye camera image, the source images are a previous or next frame of left bionic eye camera image $I_s \in \{I_{t-1}, I_{t+1}\}$, and a right bionic eye camera image $I_s = I_{tr}$; a pose of the target image relative to the source image is denoted as $T_{st}$, which is obtained by the SLAM system;

a photometric re-projection loss function $L_p$ is constructed based on the re-projection error, $L_p$ is minimized to update weight parameters of the depth estimation network based on the channel self-attention mechanism, and the photometric re-projection loss function $L_p$ is defined as follows:

$$L_p = \min_s pe(I_t, I_{s \to t}),$$

wherein pe( ) represents a photometric error comprising an L1 distance and a structural similarity (SSIM), and $I_{s \to t}$ represents a reconstructed image;

$$pe = \frac{\alpha}{2}(1 - SSIM(I_t, I_{s \to t})) + (1-\alpha)\|I_t - I_{s \to t}\|_1,$$

$$I_{s \to t} = I_s \langle proj(D_t, T_{st}, K) \rangle,$$

wherein proj( ) represents 2D coordinates of a predicted depth map $D_t$ in $I_t$, $\alpha = 0.85$; $\langle \cdot \rangle$ represents a bilinear interpolation sampling operation; K represents camera intrinsics; $D_t$ represents a predicted depth map; and $T_{st}$ represents a camera pose obtained by the SLAM system; and $$SSIM(I_t, I_{s \to t}) = \frac{(2\mu_x\mu_y + C_1)(2\sigma_{xy} + C_2)}{(\mu_x^2 + \mu_y^2 + C_1)(\sigma_x^2 + \sigma_y^2 + C_2)},$$

wherein $\mu_x$ and $\mu_y$ are luminance means, representing a brightness index in SSIM, $\sigma_x$ and $\sigma_y$ are luminance standard deviations, representing a contrast index; $\sigma_{xy}$ is luminance covariance, and a ratio of $\sigma_{xy}$ to a standard deviation product $\sigma_x\sigma_y$ represents a structural index; and $C_1$ are $C_2$ are constants to prevent errors of denominators being 0.

5. The image depth estimation method according to claim 4, wherein during the training of the depth estimation network based on the channel self-attention mechanism, an edge-aware smoothness loss Ls is further defined:
$L_s = |\partial_x d_t^*| e^{-|\partial_x I_t|} + |\partial_y d_t^*| e^{-|\partial_y I_t|}$, wherein $d_t^* = d_t/\overline{d}_t$ represents a mean-normalized inverse depth;
the photometric re-projection loss $L_p$ is combined with the edge-aware smoothness loss $L_s$ to serve as a final training loss function for the depth estimation network based on the channel self-attention mechanism:

$$L = \frac{1}{S}\sum_i^S (\mu L_p^i + \lambda L_s^i),$$

wherein S is a scale factor, and $\lambda$ is a weight of an edge-aware smoothness loss term.

6. The image depth estimation method according to claim 1, wherein a panoramic camera is used to guide gaze of the binocular bionic eye cameras, to capture a high-value image as an input for the SLAM system:

capturing a panoramic image using the panoramic camera and detecting key scene information in the panoramic image that influences execution of a SLAM task;
assigning values to pixels in the panoramic image based on the key scene information, to obtain a panoramic value map;
projecting field-of-view areas of the binocular bionic eye cameras separately onto the panoramic value map, to obtain a left field-of-view projection area and a right field-of-view projection area; controlling the left field-of-view projection area and the right field-of-view projection area to overlap with each other; and merging the left field-of-view projection area and the right field-of-view projection area to obtain a current binocular field-of-view projection area;
calculating a mean value of the current binocular field-of-view projection area in the panoramic value map; and
comparing the mean value of the current binocular field-of-view projection area with a value threshold:
if the mean value of the current binocular field-of-view projection area is greater than the value threshold, keeping the current binocular field-of-view projection area still, and using a high-value image currently captured by the binocular bionic eye cameras as an input for the SLAM system; and
if the mean value of the current binocular field-of-view projection area is less than or equal to the value threshold, searching for a target binocular field-of-view projection area with a value higher than the value threshold in the panoramic value map;
based on the current binocular field-of-view projection area and the target binocular field-of-view projection area, calculating required displacements for the binocular bionic eye cameras; moving the binocular bionic eye cameras according to the displacements, and finally using a high-value image captured by the binocular bionic eye cameras in the target binocular field-of-view projection area as an input for the SLAM system.

7. The image depth estimation method according to claim 2, wherein a panoramic camera is used to guide gaze of the binocular bionic eye cameras, to capture a high-value image as an input for the SLAM system:

capturing a panoramic image using the panoramic camera and detecting key scene information in the panoramic image that influences execution of a SLAM task;
assigning values to pixels in the panoramic image based on the key scene information, to obtain a panoramic value map;
projecting field-of-view areas of the binocular bionic eye cameras separately onto the panoramic value map, to obtain a left field-of-view projection area and a right field-of-view projection area; controlling the left field-of-view projection area and the right field-of-view projection area to overlap with each other; and merging the left field-of-view projection area and the right field-of-view projection area to obtain a current binocular field-of-view projection area;
calculating a mean value of the current binocular field-of-view projection area in the panoramic value map; and
comparing the mean value of the current binocular field-of-view projection area with a value threshold:
if the mean value of the current binocular field-of-view projection area is greater than the value threshold, keeping the current binocular field-of-view projection area still, and using a high-value image currently captured by the binocular bionic eye cameras as an input for the SLAM system; and if the mean value of the current binocular field-of-view projection area is less than or equal to the value threshold, searching for a target binocular field-of-view projection area with a value higher than the value threshold in the panoramic value map;

based on the current binocular field-of-view projection area and the target binocular field-of-view projection area, calculating required displacements for the binocular bionic eye cameras; moving the binocular bionic eye cameras according to the displacements, and finally using a high-value image captured by the binocular bionic eye cameras in the target binocular field-of-view projection area as an input for the SLAM system.

8. The image depth estimation method according to claim 3, wherein a panoramic camera is used to guide gaze of the binocular bionic eye cameras, to capture a high-value image as an input for the SLAM system:

capturing a panoramic image using the panoramic camera and detecting key scene information in the panoramic image that influences execution of a SLAM task;

assigning values to pixels in the panoramic image based on the key scene information, to obtain a panoramic value map;

projecting field-of-view areas of the binocular bionic eye cameras separately onto the panoramic value map, to obtain a left field-of-view projection area and a right field-of-view projection area; controlling the left field-of-view projection area and the right field-of-view projection area to overlap with each other; and merging the left field-of-view projection area and the right field-of-view projection area to obtain a current binocular field-of-view projection area;

calculating a mean value of the current binocular field-of-view projection area in the panoramic value map; and comparing the mean value of the current binocular field-of-view projection area with a value threshold:

if the mean value of the current binocular field-of-view projection area is greater than the value threshold, keeping the current binocular field-of-view projection area still, and using a high-value image currently captured by the binocular bionic eye cameras as an input for the SLAM system; and if the mean value of the current binocular field-of-view projection area is less than or equal to the value threshold, searching for a target binocular field-of-view projection area with a value higher than the value threshold in the panoramic value map;

based on the current binocular field-of-view projection area and the target binocular field-of-view projection area, calculating required displacements for the binocular bionic eye cameras; moving the binocular bionic eye cameras according to the displacements, and finally using a high-value image captured by the binocular bionic eye cameras in the target binocular field-of-view projection area as an input for the SLAM system.

9. The image depth estimation method according to claim 4, wherein a panoramic camera is used to guide gaze of the binocular bionic eye cameras, to capture a high-value image as an input for the SLAM system:

capturing a panoramic image using the panoramic camera and detecting key scene information in the panoramic image that influences execution of a SLAM task;

assigning values to pixels in the panoramic image based on the key scene information, to obtain a panoramic value map;

projecting field-of-view areas of the binocular bionic eye cameras separately onto the panoramic value map, to obtain a left field-of-view projection area and a right field-of-view projection area; controlling the left field-of-view projection area and the right field-of-view projection area to overlap with each other; and merging the left field-of-view projection area and the right field-of-view projection area to obtain a current binocular field-of-view projection area;

calculating a mean value of the current binocular field-of-view projection area in the panoramic value map; and comparing the mean value of the current binocular field-of-view projection area with a value threshold:

if the mean value of the current binocular field-of-view projection area is greater than the value threshold, keeping the current binocular field-of-view projection area still, and using a high-value image currently captured by the binocular bionic eye cameras as an input for the SLAM system; and if the mean value of the current binocular field-of-view projection area is less than or equal to the value threshold, searching for a target binocular field-of-view projection area with a value higher than the value threshold in the panoramic value map;

based on the current binocular field-of-view projection area and the target binocular field-of-view projection area, calculating required displacements for the binocular bionic eye cameras; moving the binocular bionic eye cameras according to the displacements, and finally using a high-value image captured by the binocular bionic eye cameras in the target binocular field-of-view projection area as an input for the SLAM system.

10. The image depth estimation method according to claim 5, wherein a panoramic camera is used to guide gaze of the binocular bionic eye cameras, to capture a high-value image as an input for the SLAM system:

capturing a panoramic image using the panoramic camera and detecting key scene information in the panoramic image that influences execution of a SLAM task;

assigning values to pixels in the panoramic image based on the key scene information, to obtain a panoramic value map;

projecting field-of-view areas of the binocular bionic eye cameras separately onto the panoramic value map, to obtain a left field-of-view projection area and a right field-of-view projection area; controlling the left field-of-view projection area and the right field-of-view projection area to overlap with each other; and merging the left field-of-view projection area and the right field-of-view projection area to obtain a current binocular field-of-view projection area;

calculating a mean value of the current binocular field-of-view projection area in the panoramic value map; and comparing the mean value of the current binocular field-of-view projection area with a value threshold:

if the mean value of the current binocular field-of-view projection area is greater than the value threshold, keeping the current binocular field-of-view projection area still, and using a high-value image currently captured by the binocular bionic eye cameras as an input for the SLAM system; and if the mean value of the current binocular field-of-view projection area is less than or equal to the value threshold, searching for a target binocular field-of-view projection area with a value higher than the value threshold in the panoramic value map;

based on the current binocular field-of-view projection area and the target binocular field-of-view projection area, calculating required displacements for the binocular bionic eye cameras;

moving the binocular bionic eye cameras according to the displacements, and finally using a high-value image captured by the binocular bionic eye cameras in the target binocular field-of-view projection area as an input for the SLAM system.

11. The image depth estimation method according to claim 6, wherein the key scene information comprises feature points and dynamic objects; the feature points are extracted using a Features from Accelerated Segment Test (FAST) keypoint detection algorithm; and a detection process of the dynamic objects involves using a YOLOv7 detection algorithm to detect the dynamic objects, to obtain detection target boxes for the dynamic objects.

12. The image depth estimation method according to claim 7, wherein the key scene information comprises feature points and dynamic objects; the feature points are extracted using a Features from Accelerated Segment Test (FAST) keypoint detection algorithm; and a detection process of the dynamic objects involves using a YOLOv7 detection algorithm to detect the dynamic objects, to obtain detection target boxes for the dynamic objects.

13. The image depth estimation method according to claim 8, wherein the key scene information comprises feature points and dynamic objects; the feature points are extracted using a Features from Accelerated Segment Test (FAST) keypoint detection algorithm; and a detection process of the dynamic objects involves using a YOLOv7 detection algorithm to detect the dynamic objects, to obtain detection target boxes for the dynamic objects.

14. The image depth estimation method according to claim 9, wherein the key scene information comprises feature points and dynamic objects; the feature points are extracted using a Features from Accelerated Segment Test (FAST) keypoint detection algorithm; and a detection process of the dynamic objects involves using a YOLOv7 detection algorithm to detect the dynamic objects, to obtain detection target boxes for the dynamic objects.

15. The image depth estimation method according to claim 10, wherein the key scene information comprises feature points and dynamic objects; the feature points are extracted using a Features from Accelerated Segment Test (FAST) keypoint detection algorithm; and a detection process of the dynamic objects involves using a YOLOv7 detection algorithm to detect the dynamic objects, to obtain detection target boxes for the dynamic objects.

16. The image depth estimation method according to claim 6, wherein the specific process of assigning values to the pixels in the panoramic image based on the key scene information comprises: assigning high pixel values to pixels located at feature points and pixels in the vicinity of the feature points in the panoramic image by using a pixel-wise assignment method, and assigning low pixel values to all pixels located within detection target boxes for the dynamic objects, wherein the pixel values assigned to the pixels in the vicinity of feature points decrease as a neighborhood radius increases, and if a pixel is assigned multiple values, a maximum value assigned to the pixel is taken.

17. The image depth estimation method according to claim 7, wherein the specific process of assigning values to the pixels in the panoramic image based on the key scene information comprises: assigning high pixel values to pixels located at feature points and pixels in the vicinity of the feature points in the panoramic image by using a pixel-wise assignment method, and assigning low pixel values to all pixels located within detection target boxes for the dynamic objects, wherein the pixel values assigned to the pixels in the vicinity of feature points decrease as a neighborhood radius increases, and if a pixel is assigned multiple values, a maximum value assigned to the pixel is taken.

18. The image depth estimation method according to claim 8, wherein the specific process of assigning values to the pixels in the panoramic image based on the key scene information comprises: assigning high pixel values to pixels located at feature points and pixels in the vicinity of the feature points in the panoramic image by using a pixel-wise assignment method, and assigning low pixel values to all pixels located within detection target boxes for the dynamic objects, wherein the pixel values assigned to the pixels in the vicinity of feature points decrease as a neighborhood radius increases, and if a pixel is assigned multiple values, a maximum value assigned to the pixel is taken.

* * * * *